(12) United States Patent
Marschner (10) Patent No.: US 8,054,473 B2
(45) Date of Patent: Nov. 8, 2011

(54) MEASUREMENT METHOD FOR DETERMINING DIMENSIONS OF FEATURES RESULTING FROM ENHANCED PATTERNING METHODS

(75) Inventor: Thomas Marschner, Dresden (DE)

(73) Assignee: Qimonda AG, Munich (DE)

( * ) Notice: Subject to any disclaimer, the term of this patent is extended or adjusted under 35 U.S.C. 154(b) by 731 days.

(21) Appl. No.: 12/112,171

(22) Filed: Apr. 30, 2008

(65) Prior Publication Data

US 2009/0273773 A1 Nov. 5, 2009

(51) Int. Cl.
*G01B 11/04* (2006.01)
*G01B 11/08* (2006.01)

(52) U.S. Cl. ........................................ 356/636; 356/401

(58) Field of Classification Search ............... 356/237.5, 356/625, 634–636, 401; 430/5, 22, 30; 438/7, 438/16, 401; 250/559.19, 559.24
See application file for complete search history.

(56) References Cited

U.S. PATENT DOCUMENTS

| | | | | |
|---|---|---|---|---|
| 4,744,662 A * | 5/1988 | Suto et al. | ...................... | 356/636 |
| 6,433,878 B1 * | 8/2002 | Niu et al. | ...................... | 356/603 |
| 6,958,819 B1 * | 10/2005 | Heaton et al. | ................. | 356/616 |
| 7,242,477 B2 | 7/2007 | Mieher et al. | | |
| 2005/0038618 A1 * | 2/2005 | Tanaka et al. | .................. | 702/83 |
| 2008/0181007 A1 * | 7/2008 | Knoefler et al. | ......... | 365/185.17 |

* cited by examiner

*Primary Examiner* — Tarifur Chowdhury
*Assistant Examiner* — Michael P Lapage
(74) *Attorney, Agent, or Firm* — Edell, Shapiro & Finnan, LLC (57) ABSTRACT

A measurement mark on a substrate has a first section with first primary and first secondary lines. The first primary lines have a first width and are arranged at a first pitch and in alternating order with the first secondary lines. A second section comprises second primary and second secondary lines arranged in alternating order. The second primary lines have a second width that is different from the first width. The pitch of the primary lines and the distance between the primary and the secondary lines is the same in each case. The spectral response of both sections of the measurement mark is determined by an analyzer unit of a measurement apparatus, and a sign of a difference between target and actual widths of the lines is determined by comparing a first spectrum derived from the first section with a second spectrum derived from the second section.

24 Claims, 9 Drawing Sheets

↓ measuring spectral responses of a first and a second section of a measurement mark, wherein each section comprises primary lines arranged at a first pitch and in alternating order with secondary lines spaced from the primary lines at a first distance, wherein a first primary width of the primary lines of the first section differs from a second primary width of the primary lines of the second section — 302

↓ determining, from the spectral responses, the sign of a difference between a target and an actual width of the primary and/or the secondary lines — 304

MEASUREMENT METHOD FOR DETERMINING DIMENSIONS OF FEATURES RESULTING FROM ENHANCED PATTERNING METHODS

BACKGROUND

In course of the fabrication of electronic devices, a substrate and layers disposed over the substrate are patterned using lithography techniques, wherein both in the substrate and in individual ones of the layers line-shaped and/or dot-shaped features may be formed. According to existing approaches in semiconductor production environments, spectrometrology methods (e.g., scatterometry or ellipsometry) process the spectral response of sections of a semiconductor wafer. Model-based fitting algorithms then, by varying the model parameters, fit the actual spectral responses with reference spectral responses calculated from a model of the respective sections in order to determine the parameters of the respective wafer sections, like the dimensions of the line-shaped or dot-shaped features in/on the substrate or in/on one of the layers.

With shrinking feature size, enhanced patterning techniques like pitch fragmentation and double exposure methods become of increasing interest, wherein, for example, the odd lines of a regular line arrangement including a plurality of parallel lines emerge from another process and may have another mean line width than the even lines of the same line arrangement. If further the material of the even lines is the same as that of the odd lines, then, though the spectral response does reflect the two mean line widths, the evaluation of the spectral response leaves open which of the lines are the narrow ones and which are the wide ones. Only after additional measurements like scanning electron microscopy, the measured line widths may be assigned to the correct type of lines (i.e., the even or the odd ones).

In light of the deficiencies of the above discussed approaches to determine feature dimensions like line widths, a need exists for improved methods and for suitable measurement marks for the determination of feature dimensions and/or for improved process control.

SUMMARY

An embodiment provides a method which processes spectral responses of four different sections of a measurement mark. Each section comprises primary lines arranged at a first pitch and in alternating order with secondary lines spaced from the primary lines at a first distance. The widths of the primary lines of the first and second sections differ by twice a first offset symmetric to a first reference width and that of the third and fourth sections differ by twice a second offset symmetric to a second, different reference width. From the spectral responses of the first and second section a first characteristic value and from the spectral responses of the third and fourth section a second characteristic value is determined. From the first and second characteristic values, at least the sign of a difference between a target and an actual width of one of the primary and the secondary lines is derived.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

Features and advantages of embodiments of the invention will be apparent from the following description of the drawings. The drawings are not necessarily to scale. Emphasis is placed upon illustrating the principles.

DETAILED DESCRIPTION

Figure 1A:
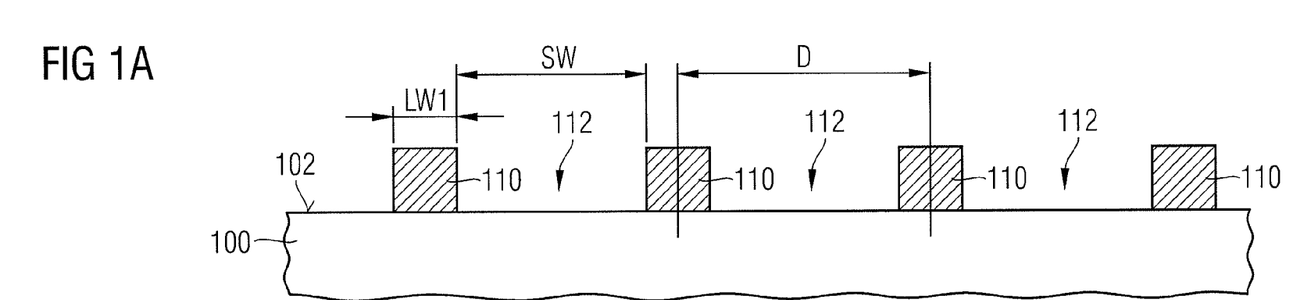
FIG. 1A is a schematic cross-sectional view of a portion of a substrate comprising line features for illustrating a double patterning method and a method of determining line widths of line features related to double patterning methods according to an embodiment.

FIG. 1A illustrates a set of primary lines 110 spaced from each other and separated by spaces 112 on a main surface 102 of a substrate 100. The primary lines 110 may be equidistantly arranged parallel to each other at a pitch D and may be formed using lithography. Due to process deviations, the widths of the primary lines 110 may fluctuate around a primary line width LW1. The widths of the spaces 112 between the primary lines 110 may fluctuate accordingly around a space width SW equal to D−LW1. The primary lines 110 have sidewalls which may be vertical or nearly vertical with respect to the main surface 102.

Figure 1B:
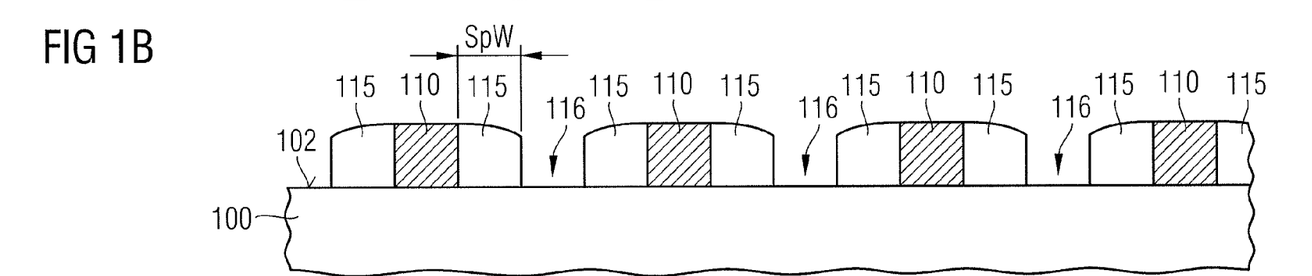
FIG. 1B is a further schematic cross-sectional view of a portion of a substrate according to FIG. 1A after forming sidewall spacers.

According to FIG. 1B, sidewall spacers 115 may be formed along the sidewalls of the primary lines 110, for example via deposition of a conformal layer having a thickness less than a half of the space width SW, and then anisotropically etching the conformal layer to remove horizontal sections of the conformal layer. FIG. 1B shows the remaining vertical sections of the conformal layer which form the sidewall spacers 115, wherein openings 116 remain between opposing sidewall spacers 115 in the spaces 112 of FIG. 1A. The widths of the sidewall spacers 115 fluctuate around a spacer width SpW.

Figure 1C:
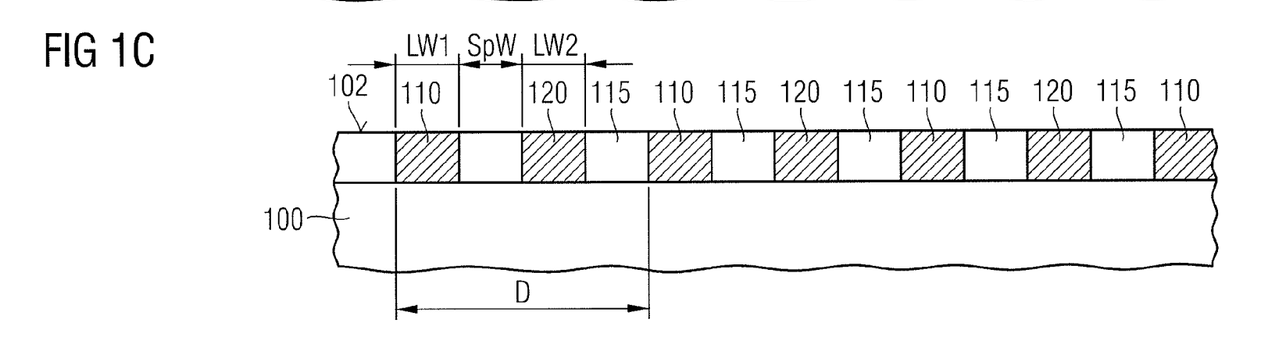
FIG. 1C is a schematic cross-sectional view corresponding to FIG. 1B after forming secondary lines using a pitch fragmentation method.

As illustrated in FIG. 1C, a set of secondary lines 120 may be formed in the openings 116, for example, by depositing a fill material filling the openings 116 and then removing those portions of the fill material that are deposited outside the openings 116. The fill material may be the same as that of the primary lines 110. The widths of the secondary lines 120 may fluctuate around a secondary line width LW2 which results from the pitch D, the primary line width LW1 and the spacer width SpW. The secondary line width LW2 may be approximately equal to the primary line width LW1 or may differ essentially from the primary line width LW1, for example by at least 10%. The spacer width SpW may be approximately equal to the primary line width LW1. According to other embodiments, the primary lines 110 are effective as sacrificial primary lines that may be removed before deposition of the fill material. Then, in accordance with further embodiments, the fill material may be deposited both in those openings resulting from removal of the sacrificial primary lines and in the remaining openings 116 such that both the final primary lines and the secondary lines result from the fill material. For example, the sidewall spacers 115 may be dielectric and the primary 110 and secondary lines 120 may be conductive or vice versa. In accordance with further embodiments, the sidewall spacers 115 may be used as an etch mask for the formation of grooves in the substrate 100, wherein the grooves or a subsequent groove fill may form lines equivalent to the primary and secondary lines 110, 120.

For the purpose of process control, typically a central section of a pattern as illustrated in FIG. 1C is inspected, wherein a strong measure signal may be received and modeling may be simpler, as no edge or transition regions may complicate the models. A spectral response of the inspected section of the structure shown in FIG. 1C may include information on SpW, LW1 and LW2, wherein the information containing SpW may be screened by applying a suitable model. Two further dimension values may be obtained that characterize LW1 and LW2, but, since the inspected section does not contain edge information, the model has no anchor to assign unambiguously the two further dimension values to the primary or secondary lines 110, 120. No information may be obtained on whether the primary lines 110 have been formed more narrow, resulting in wide secondary lines 120, or whether the primary lines 110 have been formed more wide, resulting in narrow secondary lines 120. Though explained in detail with regard to a line-by-fill method, the same considerations may apply to line-by-spacer and some double exposure methods as well.

Figure 2A:
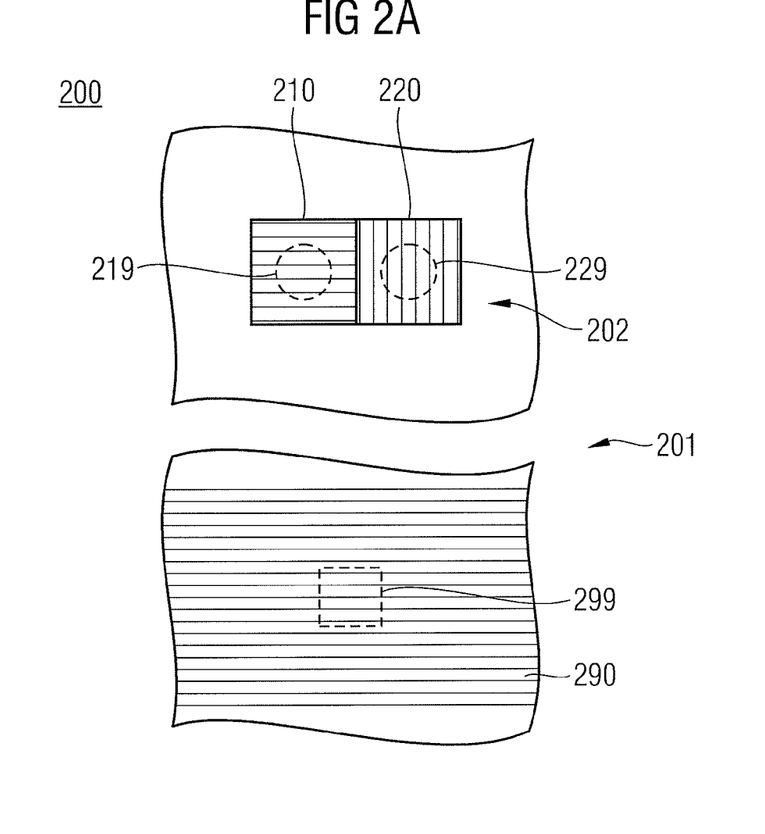
FIG. 2A is a schematic plan view on a measurement mark with two sections and a further substrate section according to an embodiment.

FIG. 2A is a top view on two sections of a substrate 201 of an integrated circuit 200 comprising a measurement mark 202 with two sections in accordance with an embodiment. The measurement mark 202 includes a first section 210 and a second section 220, central portions 219, 229 of which are illustrated in the enlarged top views shown in FIG. 2B. The integrated circuit 200 may further include a further section 290 comprising a line arrangement 299 resulting from a double patterning or pitch fragmentation method.

Figure 2B:
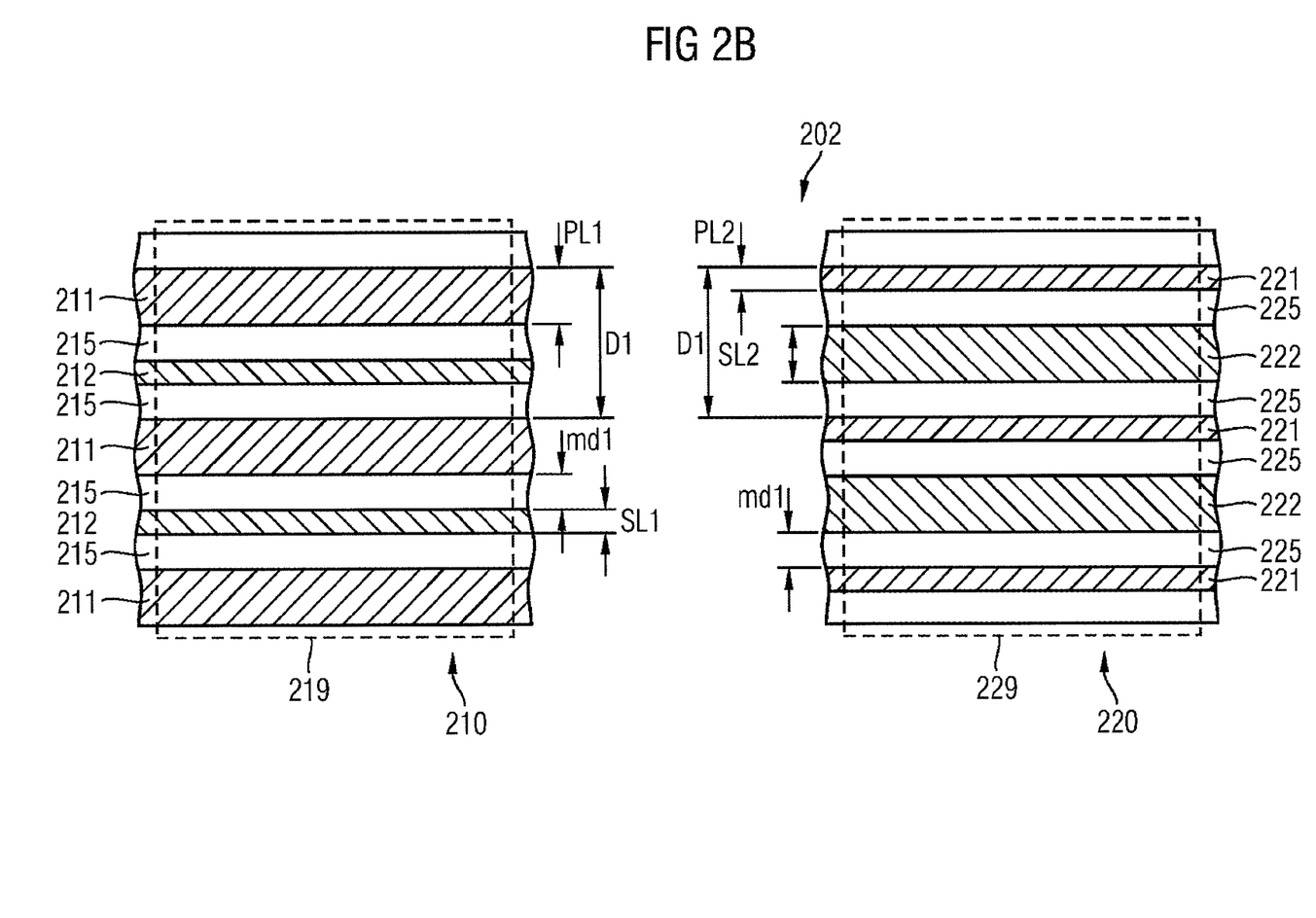
FIG. 2B shows enlarged schematic plan views on two central sections of the measurement mark of FIG. 2A.

In accordance with an embodiment as illustrated in FIG. 2B, the first section 210 includes a set of first primary lines 211 arranged equidistantly at a first pitch D1 and having a first primary line width PL1. The second section 220 includes second primary lines 221 arranged equidistantly at the first pitch D1 and having a second primary line width PL2, which is different from the first primary line width PL1. The first and second primary lines 211, 221 emerge directly from a lithography process using a mask comprising mask features corresponding to the primary lines 211, 221. The primary line widths PL1, PL2 depend directly on the dimensions of the corresponding feature on the mask, which may be a transparent or a reflective one. The first and second primary lines 211, 221 have sidewalls which may be vertical or nearly vertical with respect to a main surface of the substrate 201.

The measurement mark 202 further includes first secondary lines 212 assigned to the first section 210 and second secondary lines 222 assigned to the second section 220. In the first section 210, first primary and first secondary lines 211, 212 are arranged in alternating order at a first distance md1. In the second section 220 second primary and second secondary lines 221, 222 are arranged at the first distance md1 in alternating order.

First spaces between the first primary 211 and the first secondary lines 221 and second spaces between the second primary 221 and the second secondary lines 222 may be unfilled or filled with first and second spacer structures 215, 225 respectively. The first and second secondary lines 212, 222 may result from a pitch fragmentation method, for example, one of the methods as described above. According to another embodiment, the spacer structures 215, 225 may protrude between the primary and secondary lines.

Starting from a predetermined first distance md1 and a predetermined first pitch D1, the first and the second primary line widths PL1, PL2 may be selected such that a first secondary line width SL1 of the first secondary lines 212 is approximately equal to the second primary line width PL2 and a second secondary line width SL2 of the second secondary lines 222 is approximately equal to the first primary line width PL1. By evaluating the spectral responses of the two sections of such "symmetric" measurement mark according to a method as described with reference to FIG. 3A, at least a sign of a line width aberration of the primary lines and/or the secondary lines may be unambiguously assigned to the respective line type. Using additional calibration information, even the absolute values of the line width aberration may be determined.

Figure 2C:
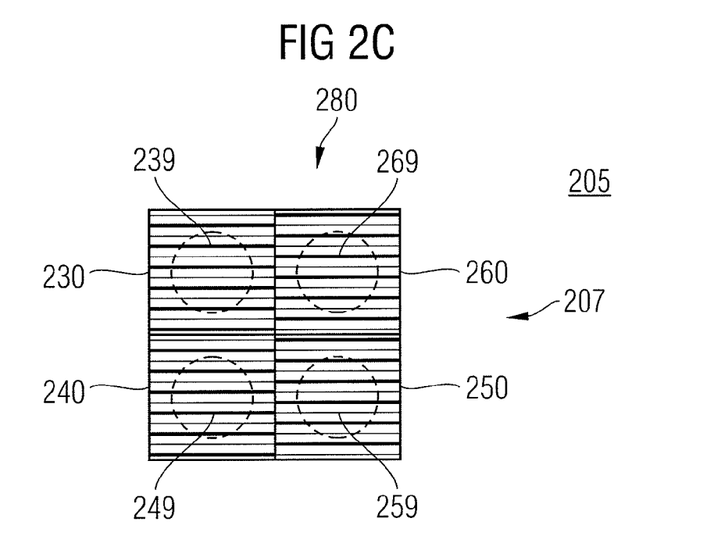
FIG. 2C is a schematic plan view on a measurement mark with four sections according to another embodiment.

FIG. 2C is a top view on a section of a substrate of an integrated circuit 205 comprising a measurement mark 207 with four sections in accordance with another embodiment. The measurement mark 207 includes a first, a second, a third and a fourth section 230, 240, 250, 260, central portions 239, 249, 259, 269 of which are illustrated in the enlarged top views illustrated in FIG. 2D. The integrated circuit 205 may also include a further section 290 as illustrated in FIG. 2E.

Figure 2D:
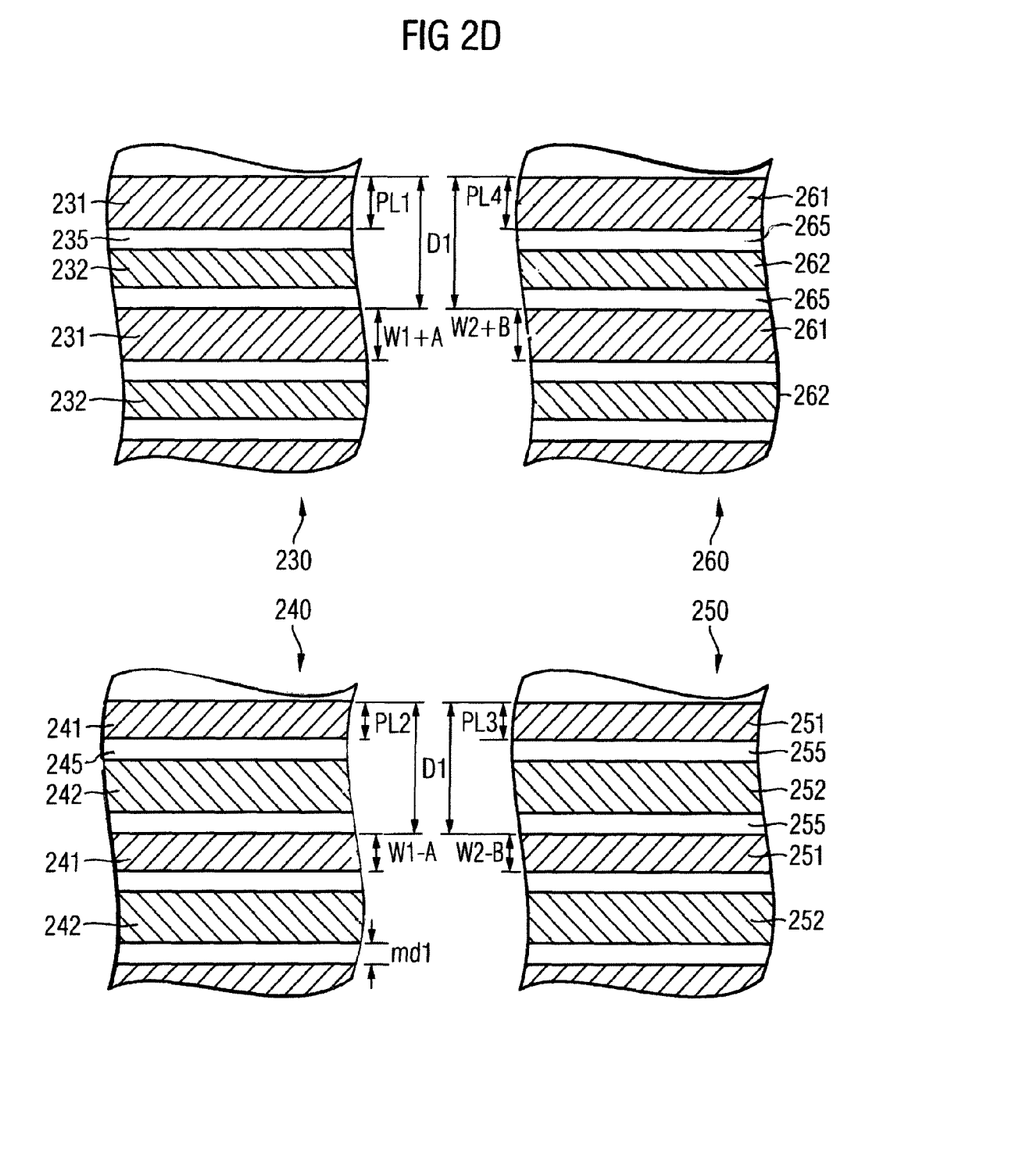
FIG. 2D are enlarged schematic plan views on four central sections of the measurement mark of FIG. 2C.

In accordance with the embodiment as illustrated in FIG. 2D, each section 230, 240, 250, 260 includes a set of primary lines 231, 241, 251, 261 arranged equidistantly at a first pitch D1. The primary lines 231, 241, 251, 261 emerge directly from a lithography process using a mask comprising mask features that correspond to the respective primary lines 231, 241, 251, 261. The primary line widths PL1, PL2, PL3, PL4 of the respective primary lines 231, 241, 251, 261 differ from each other. The first primary line width PL1 and the second primary line width PL2 may differ by twice a first offset A and are symmetric to a first reference width W1. The fourth primary line width PL4 and the third primary line width PL3 may differ by twice a second offset B and are symmetric to a second reference width W2.

In accordance with an embodiment, the second offset B is equal to the first offset A. Further, the first and the second reference widths W1, W2 may differ by twice a third offset. Each section 230, 240, 250, 260 may further include secondary lines 232, 242, 252, 262 resulting from a pitch fragmentation method and spacer structures 235, 245, 255, 265 that are disposed between each pair of primary and secondary lines and that have a width md1. Evaluating the spectral responses of the four sections 230, 240, 250, 260 of the measurement mark 207 according to a method as described with respect to FIG. 3B, sign and absolute value of a line width aberration may be determined and unambiguously assigned to either the primary or the secondary lines, wherein the line width aberration may be determined without further calibration information.

Figure 2E:
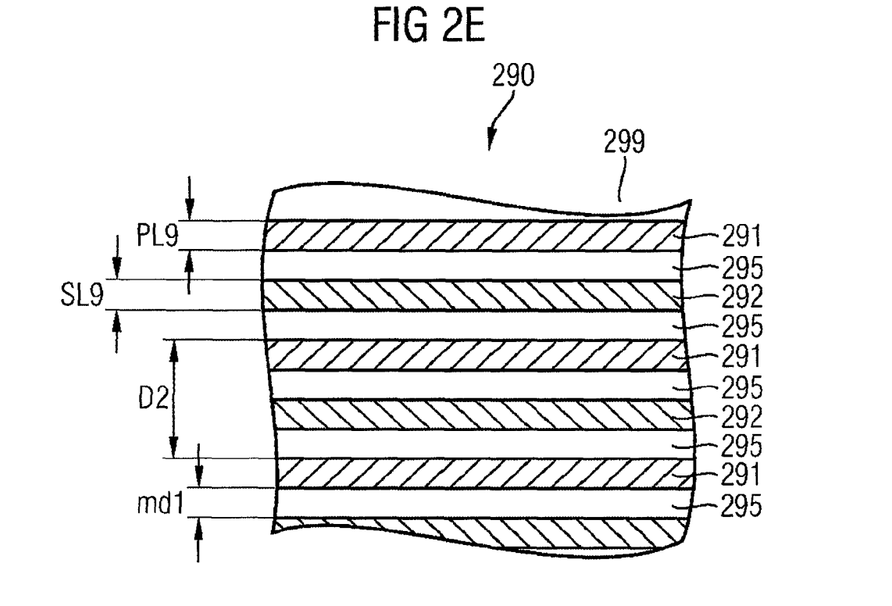
FIG. 2E is an enlarged schematic plan view on the further section of FIG. 2A.

As illustrated in FIG. 2E, the further section 290 may include a set of further primary lines 291, which have a further primary line width PL9 and which are arranged equidistantly at a second pitch D2, which may be approximately equal to the first pitch D1. According to other embodiments, the first and second pitches D1, D2 differ significantly from each other, for example by at least 10%. The further primary lines 291 emerge directly from a lithography process using a mask comprising mask features corresponding to the further primary lines 291. The further primary line width PL9 depends directly on the dimension of the corresponding feature on the mask. The further primary lines 291 have sidewalls which may be vertical or nearly vertical with respect to the main surface. The further section 290 may further include further secondary lines 292, wherein the further primary and further secondary lines 292 are arranged in alternating order at the first distance md1.

Further spaces between the further primary lines 291 and the further secondary lines 292 may be unfilled or filled with further spacer structures 295. The further secondary lines 292 may result from the same pitch fragmentation method as the first and second secondary lines 212, 222 of the measurement mark 202 as shown in FIG. 2B or as the first, second, third and fourth secondary lines 232, 242, 252, 262 of the measurement mark 207 as shown in FIG. 2D and may have a further secondary line width SL9, which may be, in accordance with an embodiment, approximately equal to the further primary line width PL9. If a conventional spectrometrology method is applied for determining the further primary and secondary line widths PL9, SL9, the measurement issues as discussed above with reference to FIG. 1C may occur. The results for the line width aberration, as determined for the measurement marks, may be transferred to the line width aberration of the further primary and secondary lines 291, 292 of the further section 290.

Figure 3A:
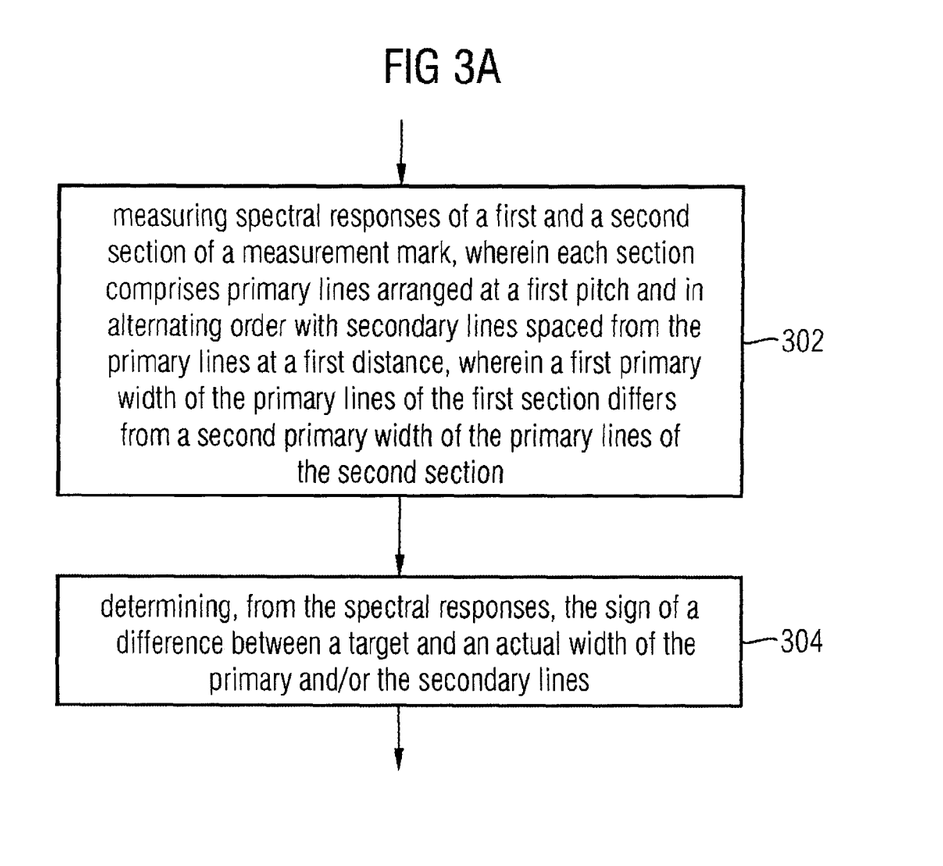
FIG. 3A is a flow chart illustrating a method of determining line widths according to a further embodiment using a measurement mark with two symmetric sections.

FIG. 3A is a flow chart of a method of determining line widths, according to an embodiment, wherein spectral responses (spectra) of the central sections 219, 229 of the first and second sections 210, 220 of the measurement mark 202 as illustrated in FIG. 2B may be determined and evaluated.

According to the method illustrated in FIG. 3A the spectral responses of a first and a second section of a measurement mark are measured (302), wherein each section includes primary lines arranged at a first pitch and in alternating order with secondary lines spaced from the primary lines at a first distance. The first primary width of the primary line of the first section differs from a second primary width of the primary lines of a second section. From the spectral responses, the sign of a difference between a target width and an actual width of the primary and/or the secondary lines is determined (304). In this way, at least the sign of the difference between the target and the actual widths may be determined exclusively from the spectral responses without taking into consideration further layer and/or material parameters.

For example, a characteristic value is obtained through a combination or a comparison of the first and second spectral responses (e.g., by calculating a sort of difference of the spectral responses). Then, the sign of a differential width aberration between a target width of one of the primary and the secondary lines and the corresponding actual width is determined, for example, on the basis of the characteristic value and a known, predetermined or pre-calibrated relationship between the sign of the width aberration and the characteristic value. From the sign of the width aberration determined from the spectral responses of the measurement mark, the sign of a width aberration occurring in another section of the substrate, which, for example, includes a dot or a line feature arrangement as illustrated in FIG. 2C, may be derived.

The absolute values of the width aberration both in the measurement mark and in further sections of the substrate may be determined by forwarding the obtained sign of the width aberration to a model algorithm. According to other embodiments, the absolute value may be derived directly from an inherent predetermined or pre-calibrated relationship between the characteristic value and the width aberration.

Figure 3B:
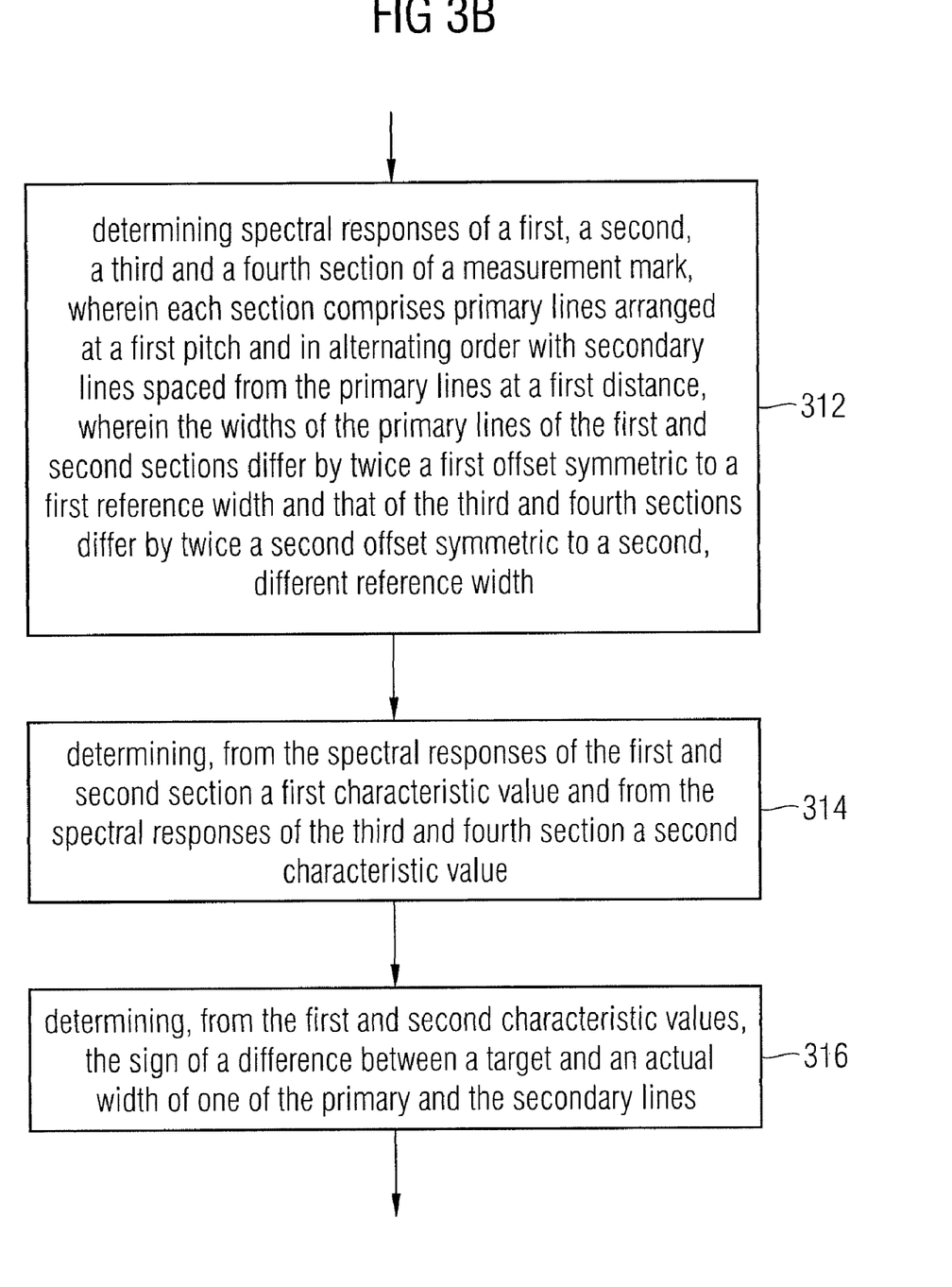
FIG. 3B is a flow chart illustrating a method of determining line widths according to another embodiment using a measurement mark with four sections.

According to the method illustrated in FIG. 3B spectral responses of a first, a second, a third and a fourth section of a measurement mark as illustrated in FIG. 2D are determined (312), wherein each section includes primary lines arranged at a first pitch and in alternating order with secondary lines spaced from the primary lines at a first distance. The widths of the primary lines of the first and second sections differ by twice a first offset A and are symmetric to a first reference width W1 and that of the third and fourth sections differ by twice a second offset B symmetric to a second reference width W2 that differs from the first reference width W1. Then, from the spectral responses of the first and second section, a first characteristic value and from the spectral responses of the third and fourth sections a second characteristic value is determined (314). From the characteristic values at least a sign of a difference between a target and an actual width of one of the primary and the secondary lines is obtained (316). According to another embodiment, the absolute value of the difference between target and actual widths may be determined as explained in detail with reference to FIG. 4B.

In the following, a method of determining line widths according to an embodiment is described in detail on base of the diagrams illustrated in FIGS. 4A-4E wherein reference is repeatedly made also to the drawings of FIGS. 2A-2E. The spectra shown in FIGS. 4A-4C reflect the frequency dependence of the reflected radiation intensity and do not necessarily correspond to real spectra, but serve mainly for the illustration of the underlying general considerations discussed below.

Referring again to the measurement mark 202 as illustrated in FIG. 2B, the central sections 219, 229 are irradiated with a suitable incident radiation and the spectral response of each of the central sections 219, 229 is determined by evaluating the radiation reflected off reflective interfaces of the sample. The incident radiation may be any suitable form of electromagnetic radiation, such as broadband radiation or monochromatic radiation with time-varying frequency. The spectral responses are obtained as the spectra of the reflected radiation. As different materials absorb and/or reflect the radiation differently, the spectra contain information about, for example, layer thicknesses, feature widths and layer materials.

Figure 4A:
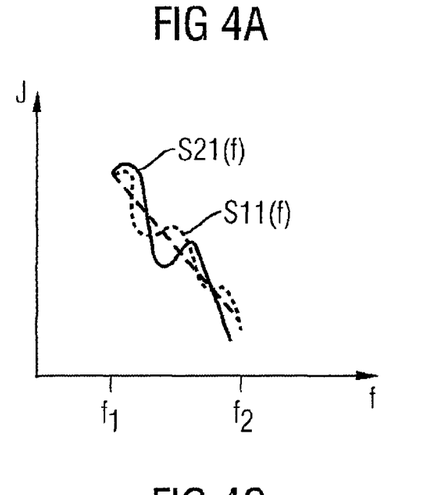
FIGS. 4A and 4B are schematic diagrams of spectra obtained from a first and a second section of the measurement mark as illustrated in FIG. 2B for illustrating a method of determining line widths according to a further embodiment.
Figure 4B:
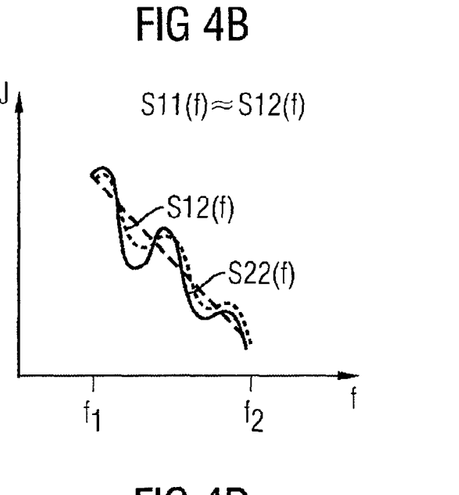

A first spectrum $S11(f)$ as indicated as a dotted line in FIG. 4A may be the spectral response of the central section of the first section and a second spectrum $S12(f)$ as indicated as a dotted line in FIG. 4B may be the spectral response of the central section of the second section of a measurement mark as depicted in FIG. 2B. A combined spectrum, for example, a differential spectrum $D1(f)$ as illustrated as dotted line in FIG. 4C, may be obtained, for example by subtracting the first spectrum $S11(f)$ from the second spectrum $S12(f)$ within a predetermined frequency range or vice-versa, or by subtracting the intensity values at one discrete frequency or a predetermined number of discrete frequencies, or by subtracting weighted or not-weighted mean intensity values referring to a suitable frequency range, or else. A suitable wavelength range may be, for example, between approximately 100 and approximately 800 nanometers or a sub-range thereof, wherein the sub-range may be adapted to the respective target line widths and/or layer configuration.

Figure 4C:
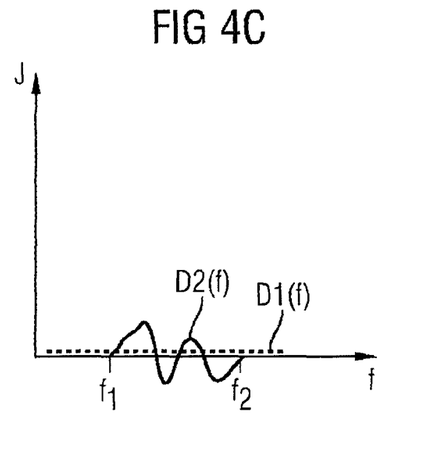
FIG. 4C is a schematic diagram of a differential spectrum obtained from the spectra illustrated in FIGS. 4A and 4B.

If the primary lines are imaged correctly, the width of the first primary lines 211 corresponds to that of the second secondary lines 222 and the width the second primary lines 221 corresponds to that of the first secondary lines 212. The first and the second sections are symmetric and their spectral responses (spectra) $S11(f)$ and $S12(f)$ do not or do not substantially deviate from each other. A difference, like the integral over the difference of the intensities in a predetermined frequency range, or a difference spectrum $D1(f)$ should be approximately zero. Further, both spectra $S11(f)$ and $S12(f)$ contain information, inter alia, on the first and second primary line widths PL1, PL2.

If, however, due to an unexpected deviation in the exposure/development/etch regime, both primary lines 211, 221 are printed narrower than intended or both primary lines 211, 221 are printed wider than intended, then the symmetry is broken. For example, if both primary lines 211, 221 are printed narrower by a width aberration E, the resulting first primary line width is PL1–E and the resulting second primary line width is PL2–E, whereas the resulting first secondary line width is PL2+E and the second secondary line width is PL1+E. The resulting first error-related spectrum $S21(f)$ as indicated as continuous line in FIG. 4A is assigned to the first section and contains information on the widths PL1–E, PL2+E. The resulting second error-related spectrum $S22(f)$ as indicated as continuous line in FIG. 4B is assigned to the second section and contains information on the widths PL2–E and PL1+E. As PL2 and PL1 are unequal, the difference spectrum $D2(f)$ as illustrated as continuous line in FIG. 4C is typically not zero.

Then a suitable characteristic value P may be obtained. For example, the characteristic value P may be the intensity difference at one discrete frequency or a sum of differences at a plurality of discrete frequencies. According to other embodiments, the characteristic value P may result from an integration over the respective differential spectrum $D1(f)$, $D2(f)$ between a lower and an upper frequency edge f1, f2 or may correspond to a not-weighted of weighted average value of the respective differential spectrum $D1(f)$, $D2(f)$ within a suitable frequency range (e.g., between the frequency edges f1 and f2). The characteristic value P may also be obtained through another combination of the spectra $S11(f)$, $S12(f)$, $S21(f)$, $S22(f)$, (e.g., for example a multiplication or a convolution)

Figure 4D:
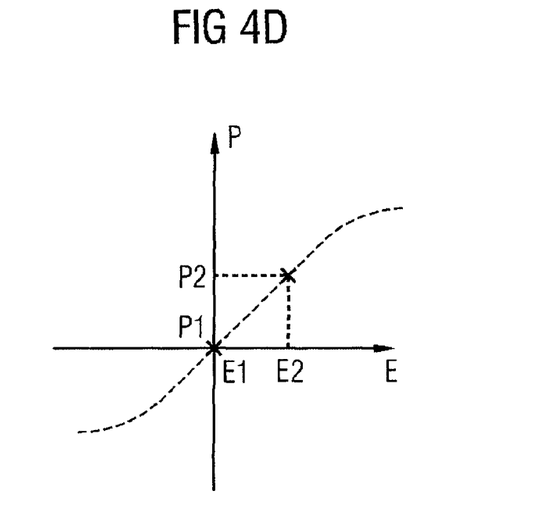
FIG. 4D is a diagram illustrating schematically the relationship between characteristic values of differential spectra and a line width aberration according to an embodiment evaluating two mask sections.

FIG. 4D is a diagram illustrating a relationship between the characteristic value P and the width aberration E. At least for values of the width aberration E about zero, the amount of the characteristic value P may depend approximately linearly on the amount of the width aberration E. The sign of the characteristic value P may reflect unambiguously the sign of the width aberration E (i.e., whether the primary lines are printed narrower or wider than intended). The relationship between the sign of the width aberration E and that of the characteristic value P may be verified one single time, for example, on the basis of an optical method (e.g., SEM (scanning electron microscopy)). Then, on the basis of the verified relationship and the differential spectrum $D2(f)$, the measured values contained in the spectral response of a further section, as illustrated in FIG. 2E, may be assigned unambiguously to the further primary and secondary line widths PL9, SL9 and to any line or dot pattern realized in the same layer and resulting from the same processes as the measurement mark.

In accordance with other embodiments, the width aberration E is derived directly from the characteristic value P. For example, if a characteristic value P1 derived from the differential spectrum $D1(f)$ of FIG. 4C is equal zero, the value of the width aberration E1 is approximately zero. A characteristic value P2 derived from the differential spectrum $D2(f)$ of FIG. 4C indicates a positive width aberration with the absolute value E1. The dependence of P on E may be calibrated by optical methods (e.g., SEM) or by modeling. According to other embodiments, the obtained sign is forwarded into a fitting algorithm to obtain the absolute value E1 or at least one of the first, second and further primary line widths PL1, PL2, PL9.

Figure 4E:
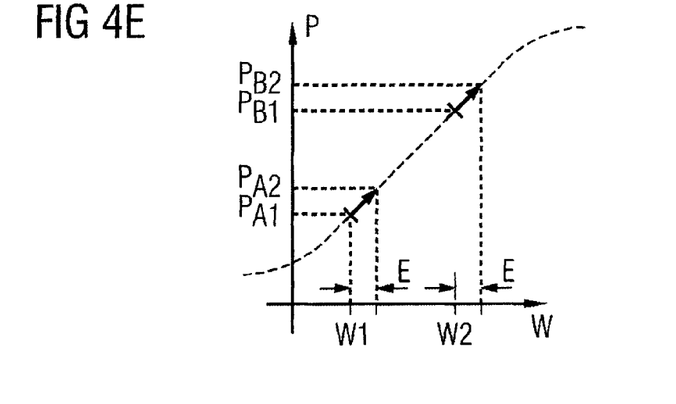
FIG. 4E is a diagram illustrating schematically the relationship between characteristic values of differential spectra and a line width aberration according to an embodiment evaluating four mask sections.

Referring to FIG. 4E, the width aberration E may be derived directly from a pair of characteristic values PA2, PB2 which, according to another embodiment may be derived from a measurement mark comprising four sections as illustrated in FIG. 2D. As the first and second sections are asymmetric to each other, the differential spectrum is characterized by a characteristic value PA1 in the case that no aberration occurs. Accordingly, as the third and fourth sections are asymmetric, the differential spectrum obtained from the third and fourth section is related to a second characteristic value PB1 in the case that no width aberration occurs. The first characteristic value PA1 is assigned to the first reference width W1 and the second characteristic value PB1 is assigned to the second reference value W2. The reference widths W1, W2 and the way, in which the characteristic values PA1, PB2 are determined, are selected such that around W1 and W2 an approximately linear relationship between the characteristic values and the width may be assumed. In the case, a width aberration E occurs, from the first and second section of the measurement mark a characteristic value PA2 and from the third and fourth section a characteristic value PB2 is obtained. For example, the absolute value of the width aberration E may be determined by setting equal PA2/(W2+E) with P2/(W1+E). The width aberration may then be equal to (PB2*W1−PA2*W2)/(PA2−PB2). As from the two characteristic values information about a slope of a linear relationship between the characteristic value and the width aberration may be obtained, an embodiment using four measurement marks may be more independent from further process parameters. In this manner, the line width aberration may be evaluated exclusively from the obtained spectra without taking into consideration further layer or material parameters. Though explained in detail with regard to intensity spectra, similar considerations may also apply to phase spectra. Accordingly, other embodiments refer to the evaluation of phase spectra.

Figure 5A:
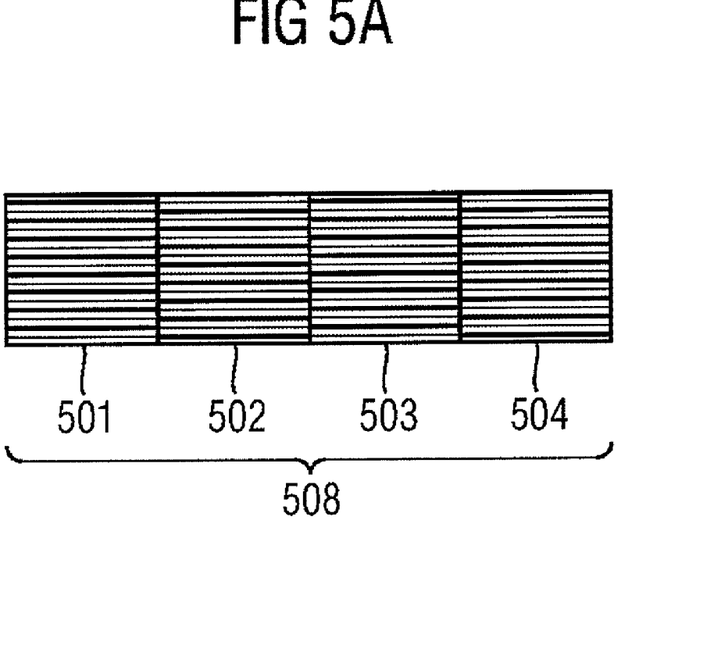
FIG. 5A is a schematic plan view on a measurement mark with sections arranged along a line according to a further embodiment.
Figure 5B:
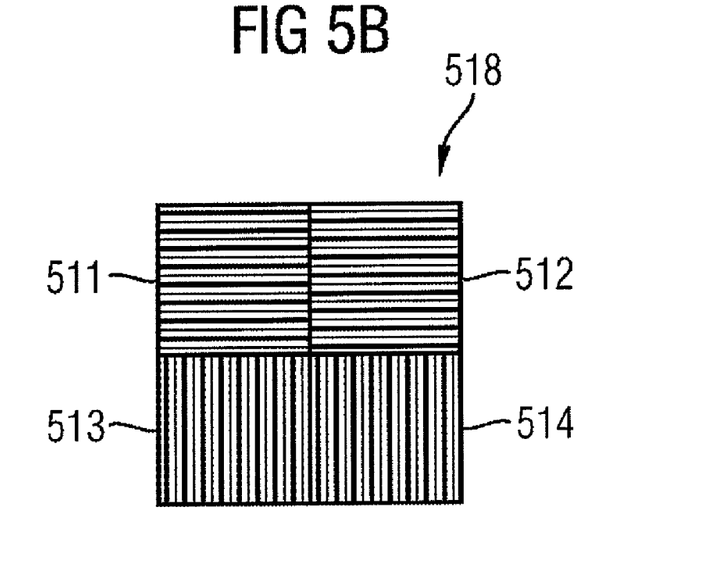
FIG. 5B is a schematic plan view on a measurement mark with sections arranged in a matrix according to a further embodiment.

As illustrated in FIG. 5A, a measurement mark 508 according to a further embodiment may include four sections 501-504, wherein each section includes in alternating order primary lines resulting directly from a lithography method and secondary lines resulting from one of the pitch fragmentation methods as described above. The widths of the primary lines of each section may differ from the widths of the primary lines of the other sections, wherein more reliable values for the characteristic values may be obtained. According to the embodiment illustrated in FIG. 5A, the two, four or more sections of the measurement mark 508 may be arranged along a line and adjoining directly to another. In accordance with the embodiment shown in FIG. 5B, a measurement mark 518 may include four or more sections 511-514 arranged along two parallel lines and adjoining directly to each other. In accordance with further embodiments, the sections of the measurement mark are distributed in different locations on the substrate, wherein further structures may be disposed in-between them. Further, the sections may be arranged along two intersecting lines.

Figure 6:
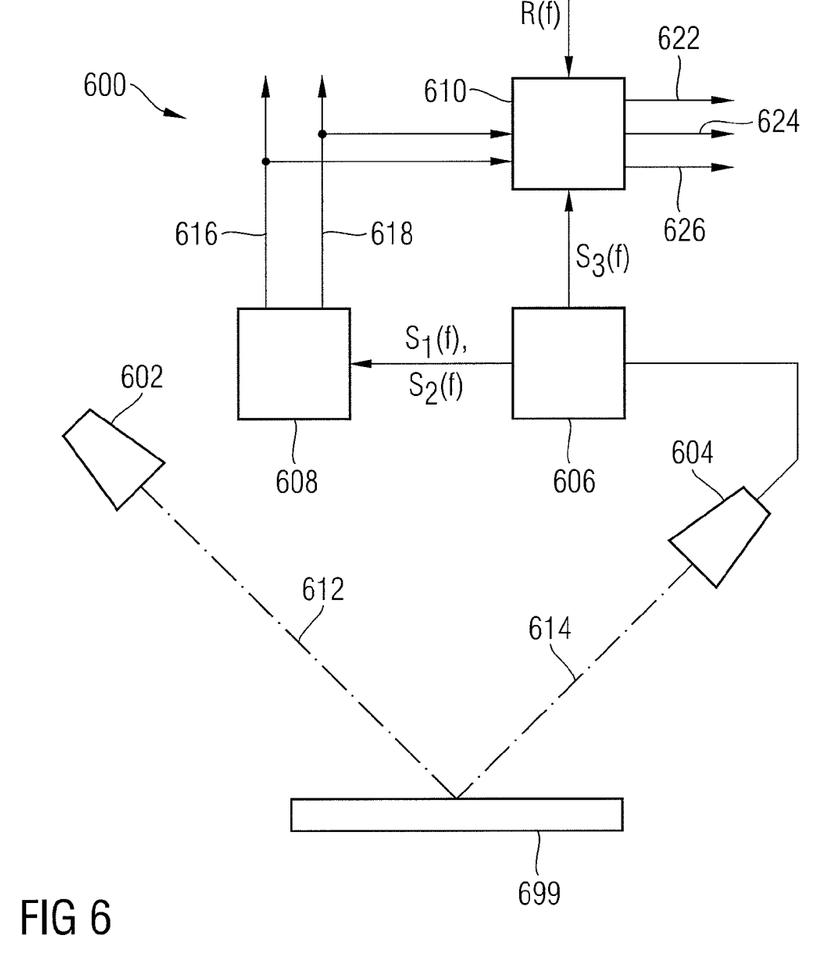
FIG. 6 is a schematic illustration of a spectrometrology apparatus for the determination of feature dimensions according to a further embodiment.

FIG. 6 refers to a measurement apparatus 600 according to another embodiment. The measurement apparatus 600 may include a radiation-emitting unit 602 for emitting radiation 612 that incidents on two, four or more sections of a measurement mark provided on or near a surface of a sample 699. The emitted radiation 612 includes a plurality of measuring frequencies and may be a monochromatic radiation, whose frequency varies with time, or a polychromatic radiation having a broadband spectrum. The sample 699 may be a partly processed semiconductor wafer from which integrated circuits are obtained. A detection unit 604 detects the reflected radiation 614 and an analyzer unit 606 may determine a plurality of spectra $S1(f)$, $S2(f)$ assigned to different sections of the measurement mark as described above. From the spectra $S1(f)$, $S2(f)$ a calculator unit 608 may determine one, two or more characteristic values P characterizing the relationship between the spectra $S1(f)$, $S2(f)$, for example, by forming a sort of a differential spectrum. The calculator unit 608 may determine the sign of a width aberration E between a target width and an actual width of a primary structure on basis of the characteristic value and a predetermined relationship between the characteristic value and the sign of the width aberration and may output information on the obtained sign as an output parameter 616. The primary structure may be a dot or a line, for example one of the primary or secondary lines of a measurement mark as described with regard to the FIGS. 2A-2E. The calculator unit 608 may further output an absolute value of the width aberration E as a further output parameter 618, for example, by relating the characteristic value P to a calibrated function relating the characteristic value P to the width aberration E.

The measurement apparatus 600 may further include a modeling unit 610 which is configured to match a reference spectrum R(f) with a further spectrum $S3(f)$, for example, the spectral response of a further section of the substrate as discussed above with regard to FIG. 2E, by varying parameters of a model of the further section that underlies the reference spectrum R(f). Output parameters 622, 624, 626 of the modeling unit 610 describe the further section, from which the further spectrum $S3(f)$ is obtained. The output parameters 616, 618 of the calculator unit 608 may be forwarded into the modeling unit 610 in order to improve the matching procedure and/or to obtain more precise output parameters 622, 624, 626. The analyzer unit 606 and the calculator unit 608 may be integrated in one combined evaluation unit. In accordance with other embodiments, the modeling unit 610 and the calculator unit 608 may be integrated in one combined processing unit.

Figure 7:
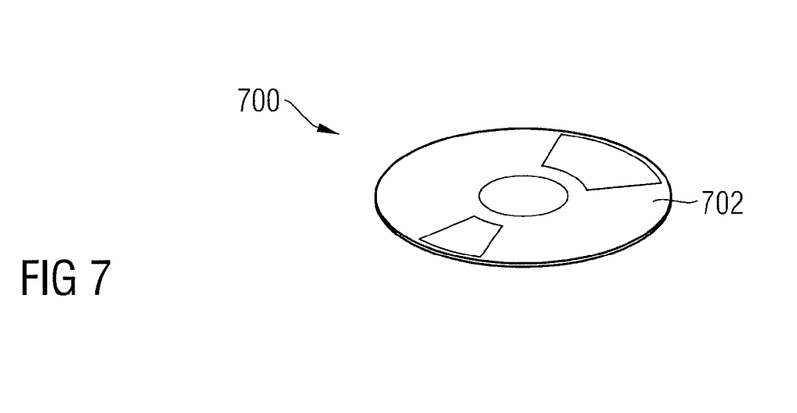
FIG. 7 is an illustration of a computer program product that includes a computer storage medium with an embedded program code mechanism according to a further embodiment.

FIG. 7 is a simplified illustration of a computer program product 700 that includes a computer storage medium 702 and a program code mechanism that is embedded in the computer storage medium. The program code mechanism includes a calculator code device configured to obtain a sign and/or an absolute value of a width aberration of lines resulting from pitch fragmentation by comparison of the spectral responses of two, four or more sections of a measurement mark on a substrate.

According to an embodiment, the computer program product may further include a data storage mechanism that is configured to hold calibration information which links characteristic values of the spectra of the sections of the measurement mark with the values of the width aberration.

A photolithography mask according to a further embodiment includes a mark pattern comprising a first section and a second section. The first section includes a set of first mask lines arranged equidistantly at a predefined pitch and having a first mask line width. The second section includes second mask lines arranged equidistantly at the pitch D1 and having a second mask line width, which is different from the first mask line width. The first and second mask lines are imaged via a lithography process on a substrate, wherein first and second primary mask lines of a measurement mark as shown in FIG. 2B may be formed.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. A method of determining line widths, the method comprising:
    measuring spectral responses of first and second sections of a measurement mark of a sample, each section comprising primary and secondary lines, the primary lines being arranged at a first pitch in alternating order with the secondary lines and the secondary lines being spaced from the primary lines at a first distance, wherein individual primary lines alternate with individual secondary lines such that a single secondary line is arranged between each adjacent pair of primary lines and a first primary width of the primary lines of the first section differs from a second primary width of the primary lines of the second section; and
    determining, from a combination of the spectral responses of the first and second sections, the sign of a difference between a target and an actual width of the primary lines or the secondary lines.

2. The method of claim 1, wherein the second primary width is equal to a first secondary width of the secondary lines of the first section.

3. The method of claim 1, wherein the primary lines are formed directly via lithography and the secondary lines are formed via a pitch fragmentation method.

4. The method of claim 1, wherein the sign of the difference is determined from a characteristic value of a differential spectrum obtained by comparison of the spectral responses of the first and second sections and a predetermined relationship between the sign of the difference and the characteristic value.

5. The method of claim 4, further comprising:
determining the absolute value of the difference between target and actual widths of one of the primary and the secondary lines from the characteristic value of the differential spectrum and a predetermined relationship between the absolute value of the difference and the characteristic value.

6. A method of determining line widths, the method comprising:
measuring spectral responses of first, second, third and fourth sections of a measurement mark, each section comprising primary lines and secondary lines, the primary lines being arranged at a first pitch and in alternating order with the secondary lines, the secondary lines being spaced apart from the primary lines at a first distance, wherein the widths of the primary lines of the first and second sections differ by twice a first offset symmetric to a first reference width and the widths of the primary lines of the third and fourth sections differ by twice a second offset symmetric to a second reference width;
determining a first characteristic value from a combination of the spectral responses of the first and second sections and determining a second characteristic value from the spectral responses of the third and fourth sections; and
determining, from the first and second characteristic values, the sign of a difference between a target and an actual width of the primary or secondary lines.

7. The method of claim 6, wherein the primary lines are formed directly via lithography and the secondary lines are formed via a pitch fragmentation method.

8. The method of claim 6, wherein the characteristic values are determined from differential spectra obtained by comparison of the respective spectral responses.

9. The method of claim 6, further comprising:
determining the absolute value of the difference between target and actual widths of one of the primary and the secondary lines from the characteristic values and the first and second amount.

10. The method of claim 6, further comprising:
determining, from the sign of the difference between the widths of the primary and the secondary lines, a sign of the difference between target and actual widths of further lines formed outside the measurement mark.

11. The method of claim 6, further comprising:
forwarding the sign of the difference between the widths of the primary and the secondary lines into a model; and
determining absolute values of the difference between the target and actual widths via the model and a fitting algorithm.

12. The method of claim 6, wherein the characteristic values are determined based on differential spectra that are obtained through subtracting the spectral responses of the first and second section and the spectral responses of the third and fourth section or vice versa.

13. The method of claim 6, wherein the characteristic values are determined based on differential spectra that are obtained through subtracting the intensities of the respective spectral responses at a predetermined number of predefined discrete frequencies.

14. An integrated circuit, comprising:
a measurement mark, including:
first, second, third and fourth sections, each section comprising primary and secondary lines, the primary lines being arranged at a first pitch and in alternating order with the secondary lines and the secondary lines being spaced at a first distance from the primary lines;
wherein widths of the primary lines of the first and second sections differ by twice a first offset symmetric to a first reference width and widths of the primary lines of the third and fourth sections differ by twice a second offset symmetric to a second reference width, the second reference width being different than the first reference width.

15. The integrated circuit of claim 14, further comprising:
further primary and further secondary lines arranged in alternating order, wherein the further primary lines are arranged at a regular pitch and have a width that differs from the width of the other primary lines.

16. The integrated circuit of claim 14, wherein the sections are arranged along a line.

17. The integrated circuit of claim 14, wherein neighboring ones of the sections adjoin.

18. A measurement apparatus, comprising:
an analyzer unit configured to measure and determine spectral responses of a sample and to output spectral data relating to the spectral responses; and
a calculator unit connected to the analyzer unit, the calculator unit being configured to determine a sign of a difference between target and actual widths of lines by comparing at least first and second spectrums corresponding to first and second sections of the sample, each section comprising primary and secondary lines, the primary lines being arranged at a first pitch and in alternating order with the secondary lines and the secondary lines being spaced apart from the primary lines at a first distance, wherein individual primary lines alternate with individual secondary lines such that a single secondary line is arranged between each adjacent pair of primary lines, and wherein the width of the primary lines of the first section differs from a width of the primary lines of the second section.

19. The measurement apparatus of claim 18, wherein the calculator unit is further configured:
to determine a first characteristic value by comparison of the first and second spectra; and
to determine, from a predefined relationship between the first characteristic value and the difference between target and actual widths of one of the primary and the secondary lines, the absolute value of the difference between target and actual widths of one of the primary and the secondary lines.

20. The measurement apparatus of claim 18, wherein the calculator unit is further configured:
to determine a first characteristic value by comparison of the first and second spectra and a second characteristic value by comparison of a third and a forth spectrum corresponding to a third and a forth section; and
to determine, from the first and second characteristic values, the absolute value of the difference between target and actual widths of one of the primary and the secondary lines.

21. A computer program product, comprising:
a non-transitory computer storage medium; and
a program code mechanism embedded in the computer storage medium, the program code mechanism, comprising:
a calculator code device configured to determine a sign of a difference between a target and an actual width of a primary or secondary line of a first or second measurement mark section from a first spectral response of the first measurement mark section and a second spectral response of the second measurement mark section, wherein:

the first measurement mark section comprises first primary and first secondary lines, the first primary lines having a first width and being arranged at a first pitch and in alternating order with the first secondary lines and the first secondary lines being spaced apart from the first primary lines at a first distance, wherein individual first primary lines alternate with individual first secondary lines such that a single first secondary line is arranged between each adjacent pair of first primary lines; and the second measurement mark section comprises second primary and second secondary lines, the second primary lines having a second width being different from the first width and being arranged at the first pitch and in alternating order with the second secondary lines being spaced apart from the second primary lines at the first distance, wherein individual second primary lines alternate with individual second secondary lines such that a single second secondary line is arranged between each adjacent pair of second primary lines.

22. The computer program product of claim 21, further comprising:

a data storage mechanism configured to store calibration information that links a characteristic value of the spectra of the sections of the measurement mark with the value of the width aberration.

23. The computer program product of claim 22, wherein the calculator code device is further configured to determine, from the calibration information and a respective characteristic value of the spectra of the sections of the measurement mark, the absolute value of the width aberration.

24. The computer program product of claim 21, wherein the calculator code device is further configured:

to determine a first characteristic value by comparison of the first and second spectra and a second characteristic value by comparison of a third and a forth spectrum assigned to a third and a forth section; and to determine, from the first and second characteristic values, the absolute value of the width aberration.

* * * * *